June 2, 1953 C. L. PETTIBONE Re. 23,665

SCUFF PLATE FOR FURNITURE

Original Filed April 11, 1949

INVENTOR.
CHARLES L. PETTIBONE
BY Richy + Watts
ATTORNEYS

Reissued June 2, 1953 Re. 23,665

UNITED STATES PATENT OFFICE 23,665

SCUFF PLATE FOR FURNITURE

Charles L. Pettibone, Shaker Heights, Ohio, assignor to The B. L. Marble Chair Company, Bedford, Ohio, a corporation of Ohio Original No. 2,603,909, dated July 22, 1952, Serial No. 86,821, April 11, 1949. Application for reissue August 26, 1952, Serial No. 306,521

9 Claims. (Cl. 45—137)

Matter enclosed in heavy brackets [ ] appears in the original patent but forms no part of this reissue specification; matter printed in italics indicates the additions made by reissue.

This invention relates to furniture and, more particularly, to separately-applied, scuff-proof articles for protecting finished surfaces and corners of desks, chairs, and the like.

For example, in the furniture art it has been proposed to mount protectors known in the trade as scuff plates at the extremity of each leg of a swivel chair, which plates are generally made of an abrasion-resistant plastic material. It has been proposed by prior workers in the art to mount such plates by means of nails or tacks imbedded in the undersurface of a rigid scuff plate, or by means of brads driven completely through the scuff plate. In the first-named construction the plate must be quite hard in order to simultaneously force the brads into the wood. This means that the plate is brittle, easily broken, and not adaptable to slight curves in the wooden base or leg surfaces. Also a press is required to assemble the plate on the chair leg or base and brads do not provide a dependable joint. Where brads are driven through the plate they must be set and the depression about the nails filled, burnished over, or otherwise concealed. In either case, the resultant joints have been weak and the cost of assembly high. Flexible scuff plates grooved to receive headed tacks have also been proposed, but these cannot be quickly assembled, may be easily pulled loose from the tacks, and readily scuffed up at the edges. Furthermore, being of rubber they deteriorate more rapidly than does a well-made piece of furniture.

It is a principal object of the present invention to reduce the assembly time and cost of mounting scuff plates or the like on furniture. Another object resides in the provision of a concealed mounting for the protecting plates that prevents detachment thereof in service. Another object of the invention resides in assuring perfect alignment and orientation of the plates with their base elements without dependence upon the skill or judgment of the workman who applies them, which plates may be assembled by a single push motion without need for tools or machinery.

Briefly, these objects and advantages are accomplished by moulding plates of plastic material, such as Bakelite, cellulose acetate butyrate, urea formaldehyde, or the like, each of which includes a pair of integral pins projecting from the undersurface. With protecting plates made and assembled in accordance with the invention, not only is the strength of the joint improved, but the saving in cost of manufacture is considerable. To assemble a plate with the piece of furniture to which it is to be attached, suitable spaced holes are bored in the base member, preferably with a multiple drill and aligning table or jig, to snugly receive the pins projecting from the plate. Adhesive is then placed in the bores and the plate is firmly pressed into position so that its underside rests snugly against the outer surface of the furniture element. During assembly air is relieved by, and the adhesive flows axially through, small channels formed in the exterior surface of the pins, and in the preferred embodiment adhesive also flows axially into a central recess formed in the pins so that a large bonding area is provided. Since the bore in the piece of furniture is blind and is closed off by the undersurface of the scuff plate the central recesses in the pins serve the additional function of receiving excess adhesive which might otherwise form a hydraulic block to final assembly of the plate. Thus, the mounting of the plate is concealed, detachment is impossible without breaking the parts, the plates are perfectly aligned, and the assembly time for each plate is greatly shortened, which materially reduces the cost of mounting the devices on furniture.

It is another object of the invention to simultaneously retain the scuff plate in place while the adhesive is setting and to cause the plate to more closely approximate the slight convex curvature usually imparted to the chair leg by the finish sanding operations. This is accomplished in the preferred method of assembly by boring the holes in the leg or base slightly closer together than the spacing of the scuff plate pins. As a result a slight curve or spring is imparted to the plate as it is assembled with the base, so that the plate fits the base accurately and is firmly retained without need for clamps until the adhesive sets.

Another object resides in insuring a firm bond between the pins of the plate and the walls of the bores in the base. This is attained by employing an adhesive which not only adheres firmly to the wood but which contains a solvent that partially dissolves or softens the outer portions of the pins, so that when the adhesive sets the parts are bonded to form a virtually one-piece assembly.

Still another object resides in reducing the quantity of plastic material that composes the plates, this being accomplished by molding the plates so that the underside is hollow, there preferably being reinforcing ribs.

The manner in which the aforesaid objects and advantages may be accomplished will be apparent from the following detailed description of a preferred embodiment of the invention.

Figure 1:
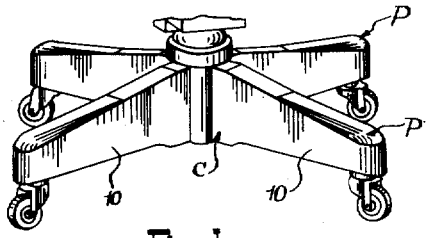
Fig. 1 is a perspective view showing scuff plates applied to the feet of swivel chairs.

As seen in Fig. 1, which illustrates a preferred application of the invention, the chair C has a plurality of legs 10 which have applied to their extremities or basefeet scuff plates P. Each plate P has an elongated, gracefully-rounded exterior, and is preferably molded from a plastic material which is wear-resistant without being brittle and which is somewhat resilient or flexible and yet tends to retain its shape against ordinary usage in service. Although there are many materials that meet these requirements, I have found that plastic material formed of cellulose acetate butyrate, which is commercially available to the trade, gives highly satisfactory results.

As seen in the drawings, scuff plate P is preferably hollowed out at its undersurface as at 11 in order to save material. However, due to the inclusion of longitudinal ribs 12 and lateral ribs 13 formed in the molding process, the plate has ample rigidity and will not scuff or be kicked clear of the feet after mounting.

An important feature of the plate resides in the two pins 14 extending from the undersurface thereof, formed integrally in the molding operation and relied upon to attach the plate to its base surface. Preferably a blind bore 15 is molded in the pins to receive an excess of adhesive, and one or more axial grooves 16 are formed on the exterior of the pins to act as air and adhesive escape vents.

Figure 2:
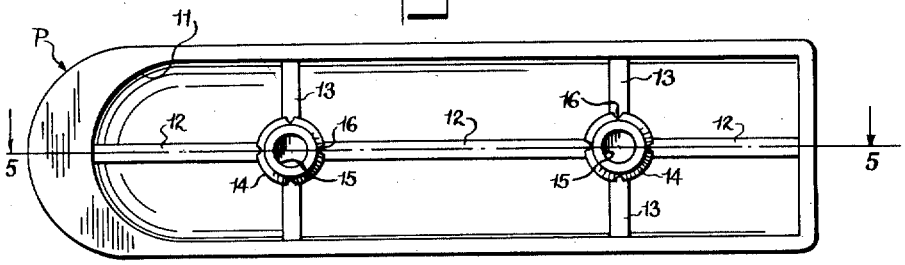
Fig. 2 is a view of the underside of one of the scuff plates formed in accordance with the invention.
Figure 4:
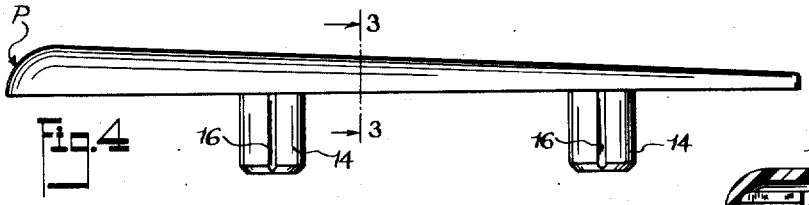
Fig. 4 is a side elevation of one of the scuff plates.
Figure 3:
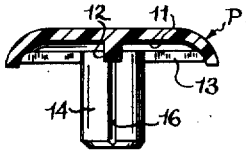
Fig. 3 is a section taken on 3—3 of Fig. 4.
Figure 5:
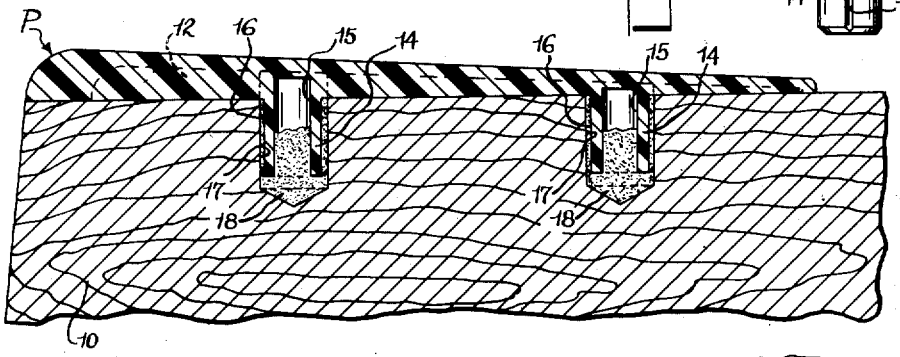
Fig. 5 is a section taken on 5—5 of Fig. 2 with the scuff plates assembled with the basefoot of a chair.
Figure 6:
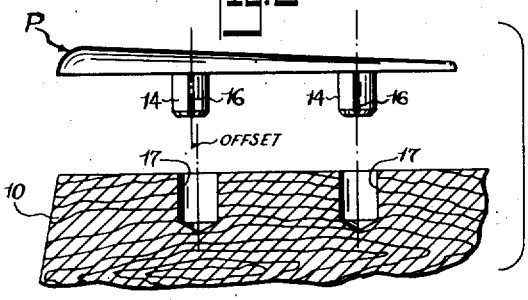
Fig. 6 shows how the holes may be bored closer together than the spacing of the pins, the difference being exaggerated in the figure for purposes of illustration.

As best seen in Fig. 5, the wooden base member 10 (a chair basefoot), has bored therein a pair of holes 17, and preferably the holes are not in exact alignment with the pins 14. For example, I have found that by employing a multiple drill wherein the bits are approximately ten thousandths of an inch closer together than the pins 14, satisfactory results are obtained. The surfaces of wooden furniture in production are sanded on large sanding machines generally being held against a moving abrasive by hand. The nature of the machines and of the operation is such that perfectly flat surfaces on legs such as 10 in Fig. 5 are difficult to obtain, the tendency being to produce surfaces that are slightly convex. By spacing bores 18 as described, a press fit is obtained with the pins 14, the action being such as to tend to spring the plate P slightly so that its undersurface is somewhat convex. Of course, the walls of the bores in the basefeet may give somewhat and the pins 14 may be canted slightly, but the deformation of the plate body and the pins is such that it is imperceptible. However, the plate does tend to conform to a slightly convex surface, and in addition pressure of the bore side walls against the pins tends to firmly retain the plate in position.

Of course, before assembling the plate with the base 10, suitable adhesive 18 is placed in the bores 17. As the plate is assembled with the base, adhesive is forced up into the bores 15 in the pins and along the notches 16. Simultaneously, notches 16 vent air from the bores and so prevent a pneumatic block from occurring that might render assembly difficult. Thus, the adhesive has a very large area to contact with both the walls of the bores 18 and with the inner and outer surfaces of the pins so that a very firm union is provided.

To augment the strength of the joint, I prefer to use a quick-setting adhesive and in accordance with one aspect of the invention I contemplate employment of an adhesive that contains a solvent for the plastic material of the plate. For example, an adhesive wherein the bonding agent is dissolved in acetone will soften or slightly dissolve minute portions of the surface of the pins whereupon when the adhesive sets the entire structure becomes in effect a one-piece assembly. Due to the relation of the holes and base 10 to the pins, no clamps, presses, nor weights need be placed upon the plate while the adhesive is setting.

I have found in actual practice that the cost of fitting the chair with four plates (as shown in Fig. 1) in accordance with the principles of this invention has been greatly reduced. In fact, the entire set of plates can be fitted to a chair in less than the length of time it took to apply and finish one plate wherein brads were utilized as the holding means. The joint with the wood is so strong that the plate will break before the pins can be extracted. However, the plastic material is tough enough so that it will not break in ordinary service. Yet, the material may flex slightly to conform to slight irregularities in the base. So long as the multiple drills are properly adjusted and aligned with the table of the machine in order that the bores 18 are positioned properly, there can be no misplacement or assembly of the plates in a misaligned condition, and also since the plates can be palm-pushed into place there is no danger of marring or breakage thereof. This reduces the skill and judgment required on the part of the workman responsible for the assembly, and insures that a perfectly-aligned, unmarred product will be produced.

Having completed a detailed description of a preferred form of the invention, it will be apparent that various modifications thereof may be made without departing from the essence of the invention as defined in the appended claims.

What is claimed is:

1. A scuff plate for attachment to a furniture element having spaced bores extending from an exposed surface, comprising an elongated plate of plastic material and a plurality of axially-spaced integral pins extending from the undersurface of the plate for insertion in the bores in the furniture element, said pins being counterbored to receive adhesive material disposed in the bores in said furniture element and displaced by said pins.

2. A scuff plate for attachment to a furniture element having spaced bores extending from an exposed surface, comprising an elongated plate of plastic material and a plurality of axially-spaced integral pins extending from the undersurface of the plate for insertion in the bores in the furniture element, said pins being externally grooved to vent air and excess adhesive from the bores and counterbored to receive adhesive material disposed in the bores in said furniture element and displaced by said pins.

3. A scuff plate for attachment to a furniture element having spaced bores extending from an exposed surface, comprising an elongated plate of plastic material and a plurality of axially-spaced integral pins extending from the undersurface of the plate for insertion in the bores in the furniture element, the underside of said plate being hollow and including reinforcing ribs, said pins being counterbored to receive adhesive material disposed in the bores in said furniture element and displaced by said pins.

4. In combination in a chair having legs with generally horizontal feet portions, a pair of spaced bores extending downwardly from the upper surface of each foot portion, scuff plates of molded plastic material having pins extending from their undersurface and pressed into said bores, the axes of each pair of bores being slightly offset from those of the associated pins and arranged to cause the plate to buckle slightly outwardly and be firmly retained in place, and adhesive in said bores bonded to said pins.

5. In combination in a chair having legs with generally horizontal feet portions, a pair of spaced bores extending downwardly from the upper surface of each foot portion, scuff plates of molded plastic material having pins extending from their undersurface and pressed into said bores, the axes of each pair of bores being slightly offset from those of the associated pins and arranged to cause the plate to buckle slightly outwardly and be firmly retained in place, and adhesive in said bores containing a solvent for said plastic bonded to said pins and feet.

*6. A scuff plate for attachment to a furniture element having spaced bores extending from an exposed surface comprising an elongated plate of plastic material and a plurality of axially spaced integral pins extending from the undersurface of the plate for insertion in the bores in the furniture element, said pins being counterbored and having portions adapted to tightly engage the sides of the bores in the furniture.*

*7. A scuff plate for attachment to a furniture element having spaced bores extending from an exposed surface comprising an elongated plate of plastic material and a plurality of axially spaced integral pins extending from the undersurface of the plate for insertion in the bores of the furniture element, said pins being externally grooved to vent air from the bores and having portions adapted to tightly engage the sides of the bores in the furniture.*

*8. In combination in a chair having legs with generally horizontal feet portions, a pair of spaced bores extending downwardly from the upper surface of each foot portion, scuff plates of molded plastic material having pins extending from their undersurface and pressed into said bores, the axes of said pair of bores being slightly offset from those of the associated pins and arranged to cause the plate to buckle slightly outwardly and be firmly retained in place.*

*9. In combination in a chair having legs with generally horizontal feet portions a pair of spaced bores extending downwardly from the upper surface of each foot portion, scuff plates of molded plastic material having pins extending from the under surface and pressed into said bores, said pins having portions intially spaced from the axes of said bores further than the corresponding portions of the side walls of said bores tightly engaging said bores.*

CHARLES L. PETTIBONE.

References Cited in the file of this patent or the original patent

UNITED STATES PATENTS

| Number | Name | Date |
|---|---|---|
| 1,051,508 | Miller | Jan. 28, 1913 |
| 2,156,003 | Tinnerman | Apr. 25, 1939 |
| 2,193,719 | Foote | Mar. 12, 1940 |
| 2,217,754 | Johnson | Oct. 15, 1940 |
| 2,385,352 | Davis | Sept. 25, 1945 |
| 2,389,944 | Winkel | Nov. 27, 1945 |
| 2,509,037 | Flicker | May 23, 1950 |